United States Patent
Pudelski et al.

(10) Patent No.: US 6,211,122 B1
(45) Date of Patent: Apr. 3, 2001

(54) CARBOXYLIC COMPOSITIONS AND DERIVATIVES THEREOF AND USE AS LUBRICATING OIL AND FUEL ADDITIVES

(75) Inventors: John K. Pudelski, South Euclid; Jeffry G. Dietz, University Heights; Matthew R. Sivik, Parma, all of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/122,949

(22) Filed: Jul. 27, 1998

(51) Int. Cl.⁷ ............................. C10M 159/12; C10L 1/22
(52) U.S. Cl. ..................... 508/222; 44/330; 508/305; 508/454; 564/201; 564/204
(58) Field of Search ..................... 508/222, 305, 508/454; 564/201, 204; 44/330

(56) References Cited

U.S. PATENT DOCUMENTS

| | | | | |
|---|---|---|---|---|
| 5,674,819 | * | 10/1997 | Sivik et al. ............ | 508/234 |
| 5,681,799 | | 10/1997 | Song et al. ............ | 508/454 |
| 5,696,060 | * | 12/1997 | Baker et al. ............ | 508/222 |
| 5,696,067 | * | 12/1997 | Adams ............ | 508/476 |
| 5,739,356 | * | 4/1998 | Dietz et al. ............ | 549/285 |
| 5,774,742 | * | 7/1998 | Baker ............ | 508/454 |
| 5,777,142 | | 7/1998 | Adams et al. ............ | 554/213 |
| 5,777,742 | * | 7/1998 | Adams ............ | 525/213 |
| 5,779,742 | | 7/1998 | Baker ............ | 44/330 |
| 5,786,490 | | 7/1998 | Dietz et al. ............ | 549/269 |
| 5,789,490 | * | 7/1998 | Dietz et al. ............ | 508/246 |
| 5,840,920 | * | 11/1998 | Baker ............ | 549/266 |
| 5,851,377 | * | 12/1998 | Bush ............ | 208/48 AA |
| 5,851,966 | * | 12/1998 | Baker et al. ............ | 508/454 |
| 5,856,279 | * | 1/1999 | Baker ............ | 508/454 |
| 5,856,524 | * | 1/1999 | Dietz et al. ............ | 549/288 |
| 5,912,213 | * | 6/1999 | Baker et al. ............ | 508/542 |

FOREIGN PATENT DOCUMENTS

0759443 A2   2/1997  (EP) .
W098/05741   8/1997  (WO) .

* cited by examiner

*Primary Examiner*—Margaret Medley
(74) *Attorney, Agent, or Firm*—Joseph P. Fischer

(57) ABSTRACT

A carboxylic composition comprising hydrocarbon substituted carboxylic acylating agents prepared by reacting a polyolefin and a terpolymer, simultaneously or individually in any order, with at least one carboxylic reactant selected from the group consisting of compounds of the formula $R^3C(O)(R^4)_nC(O)OR^5$ (IV) wherein each of $R^3$ and $R^5$ is independently H or a hydrocarbyl group, $R^4$ is a divalent hydrocarbylene group, and n is 0 or 1, and reactive sources thereof, derivatives of the foregoing carboxylic compositions, with one or more of (1) an amine characterized by the presence within its structure of at least one HN<group; (2) an alcohol; (3) a reactive metal or a reactive metal compound; and (4) a mixture of two or more of (1) through (3); the components of (4) being reacted with the mixture of carboxylic acylating agents simultaneously or sequentially, in any order, and additive concentrates and lubricating oil and fuel compositions containing these compositions.

56 Claims, No Drawings

CARBOXYLIC COMPOSITIONS AND DERIVATIVES THEREOF AND USE AS LUBRICATING OIL AND FUEL ADDITIVES

FIELD OF THE INVENTION

This invention relates to carboxylic compositions, derivatives thereof and use thereof as intermediates for preparing lubricating oil and fuel additives and as performance improving additives for lubricating oils and fuels.

BACKGROUND OF THE INVENTION

The viscosity of lubricating oils, particularly the viscosity of mineral oil based lubricating oils, is generally dependent upon temperature. As the temperature of the oil is increased, the viscosity usually decreases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Numerous types of additives are used to improve lubricating oil and fuel compositions. Such additives include, but are certainly not limited to dispersants and detergents of the ashless and ash-containing variety, oxidation inhibitors, anti-wear additives, friction modifiers, and the like. Such materials are well known in the art and are described in many publications, for example, Smalheer, et al., "Lubricant Additives", Lezius-Hiles Co., Cleveland, Ohio, USA (1967); M. W. Ranney, Ed., "Lubricant Additives", Noyes Data Corp., Park Ridge, N.J., USA (1973); M. J. Satriana, Ed., "Synthetic Oils and Lubricant Additives, Advances since 1977", Noyes Data Corp., Park Ridge, N.J., USA (1982), W. C. Gergel, "Lubricant Additive Chemistry", Publication 694-320-65R1 of The Lubrizol Corp., Wickliffe, Ohio, USA (1994); and W. C. Gergel et al., "Lubrication Theory and Practice" Publication 794-320-59R3 of The Lubrizol Corp., Wickliffe, Ohio, USA (1994); and in numerous United States patents, for example, Chamberlin, III, U.S. Pat. No. 4,326,972, Schroeck et al., U.S. Pat. No. 4,904,401, Blystone et al., U.S. Pat. No. 5,356,546 and Ripple et al., U.S. Pat. No. 4,981,602. Many such additives are frequently derived from carboxylic reactants, for example, acids, esters, anhydrides, lactones, and others. Specific examples of commonly used carboxylic compounds used as intermediates for preparing lubricating oil additives include alkyl- and alkenyl substituted succinic acids and anhydrides, polyolefin substituted carboxylic acids, aromatic acids, such as salicylic acids, and others. Illustrative carboxylic compounds are described in Meinhardt et al., U.S. Pat. No. 4,234,435; Norman et al., U.S. Pat. No. 3,172,872; LeSuer et al., U.S. Pat. No. 3,454,607, and Rense, U.S. Pat. No. 3,215,707.

Dispersants are well-known in the lubricating art. Dispersants are employed in lubricants to keep impurities, particularly those formed during operation of mechanical devices such as internal combustion engines, automatic transmissions, etc. in suspension rather than allowing them to deposit as sludge or other deposits on the surfaces of lubricated parts.

Conventional dispersants are poor contributors to improving high temperature, e.g., 100° C., viscosity. Mixtures of conventional dispersants with polymeric viscosity improvers are often used but such combinations are costly and may adversely affect low temperature viscometric performance.

Dispersant-viscosity improvers which provide both dispersancy and viscosity improving characteristics to an oil are well known.

It has now been found that mixtures of carboxylic compositions and derivatives thereof, as set forth in greater detail hereinbelow provide improved 100° C. viscosity to lubricants without adversely affecting low temperature properties.

SUMMARY OF THE INVENTION

The present invention relates to a carboxylic composition comprising hydrocarbon substituted carboxylic acylating agents prepared by reacting, optionally in the presence of an acidic catalyst, a polyolefin and a terpolymer, simultaneously or individually in any order, with at least one carboxylic reactant selected from the group consisting of compounds of the formula $$R^3C(O)(R^4)_nC(O)OR^5 \qquad (IV)$$

wherein each of R and R is independently H or a hydrocarbyl group, $R^4$ is a divalent hydrocarbylene group, and n is 0 or 1, and reactive sources thereof.

In another embodiment, the invention relates to derivatives of the foregoing carboxylic composition, with one or more of (1) an amine characterized by the presence within its structure of at least one HN<group; (2) an alcohol; (3) a reactive metal or a reactive metal compound; and (4) a mixture of two or more of (1) through (3); the components of (4) being reacted with the mixture of carboxylic acylating agents simultaneously or sequentially, in any order.

Additive concentrates containing these compositions and lubricating oil and fuel compositions are also contemplated.

DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

It must be noted that as used in this specification and appended claims, the singular forms also include the plural unless the context clearly dictates otherwise. Thus the singular forms "a", "an", and "the" include the plural; for example "a monomer" includes mixtures of monomers of the same type. As another example the singular form "monomer" is intended to include both singular and plural unless the context clearly indicates otherwise.

In the context of this invention the term "copolymer" means a polymer derived from two or more different monomers. Thus, a polymer derived from a mixture of, for example, ethylene and propylene, is a copolymer as defined herein.

The Carboxylic Compositions

The carboxylic compositions of this invention comprise the hydrocarbon substituted carboxylic acylating agents prepared by reacting, optionally in the presence of an acidic catalyst, a polyolefin and a terpolymer, simultaneously or individually in any order, with at least one carboxylic reactant selected from the group consisting of compounds of the formula $$R^3C(O)(R^4)_nC(O)OR^5 \qquad (IV)$$

wherein each of $R^3$ and $R^5$ is independently H or a hydrocarbyl group, $R^4$ is a divalent hydrocarbylene group, and n is 0 or 1, and reactive sources thereof.

The Polyolefin

The polyolefin, from which the carboxylic composition is derived, is typically derived from olefins containing from 2 to about 28 carbon atoms, and mixtures thereof, more often from homopolymerized and interpolymerized olefins having from 2 to about 10 carbon atoms,. Typically, the olefins are alpha olefins. The polyolefins usually have number average molecular weights ($\overline{M}_n$) ranging from about 300 to about 20,000, often up to about 10,000, preferably from about 300 to about 5000, often from about 700 to about 5,000, frequently to about 2500.

In one preferred embodiment, the polyolefin is derived from polybutene, that is, a polymer of $C_4$ olefins, including 1-butene, 2-butene and isobutylene. Those derived from isobutylene, i.e., polyisobutylenes, are especially preferred. In another preferred embodiment, the polyolefin is a polypropylene. In another preferred embodiment, the polyolefin is an ethylene-alpha olefin polymer, particularly ethylene-propylene polymers. Molecular weights of such polymers may vary over a wide range, but especially preferred are those having number average molecular weights ($\overline{M}_n$) ranging from about 300 to about 20,000, preferably from about 300 to about 10,000, often from about 700 to about 5000, particularly up to about 2500.

A preferred source of polybutenes is that obtained by polymerization of a $C_4$ refinery stream having a butene content of 35 to 75 weight percent and isobutylene content of 15 to 60 weight percent in the presence of a Lewis acid catalyst such as aluminum trichloride or boron trifluoride. These polybutenes contain predominantly (greater than 80% of total repeating units) isobutylene repeating units of the configuration

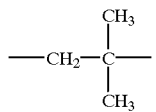

These polybutenes are typically monoolefinic, that is they contain but one olefinic bond per molecule.

The olefinic compound may be a polyolefin comprising a mixture of isomers wherein from about 50 percent to about 65 percent are tri-substituted olefins wherein one substituent contains from 2 to about 500 carbon atoms, often from about 30 to about 200 carbon atoms, more often from about 50 to about 100 carbon atoms, usually aliphatic carbon atoms, and the other two substituents are lower alkyl.

When the olefin is a ti-substituted olefin, it frequently comprises a mixture of cis- and trans-1-lower alkyl-1-(aliphatic hydrocarbyl containing from 30 to about 100 carbon atoms)-2-lower alkyl ethene and 1,1-di-lower alkyl-2-(aliphatic hydrocarbyl containing from 30 to about 100 carbon atoms) ethene.

In one embodiment, the monoolefinic groups are predominantly vinylidene groups, e.g., groups of the formula

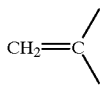

especially those of the formula

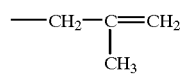

although the polybutenes may also comprise other olefinic configurations.

In one embodiment the polybutene is substantially monoolefinic, comprising at least about 30 mole %, preferably at least about 50 mole % vinylidene groups, more often at least about 70 mole % vinylidene groups. Such materials and methods for preparing them are described in U.S. Pat. Nos. 5,286,823 and 5,408,018, which are expressly incorporated herein by reference. They are commercially available, for example under the tradenames ULTRAVIS® (BP Chemicals) and GLISSOPAL® (BASF).

The Terpolymer

The terpolymer is a copolymer derived from at least two olefins, usually alpha olefins, and a non-conjugated polyene, preferably a diene or triene, usually a diene. The terpolymers are generally lower molecular weight terpolymers such as those having $\overline{M}_n$ ranging from about 1000 to about 15,000, more often from about 2500 to about 10,000, and frequently from about 5000 to about 9000.

One of the olefins is usually ethylene and the other is an olefin having from 3 to about 28 carbon atoms, often 3 to about 8 carbon atoms, more often 3 or 4 carbon atoms. Most often one olefin is ethylene and the other is propylene.

The third component utilized in preparing the terpolymer is at least one non-conjugated polyene, usually a diene. Examples include aliphatic dienes such as 1,4- and 1,5-hexadienes, branched dienes such as 3- and 4-methyl 1,4-hexadienes, bicyclic dienes such as exo- and endo-dicyclopentadiene, exo- and endo-alkenyl norbornenes, alkyl alkenyl norbornenes, alkylidene norbornenes such as 5-methylene-2-norbornene, alkyl norbornadienes such as methyl norbornadiene, cyclodienes, etc. In a preferred embodiment, the diene is a dicyclopentadiene or alkylidene norbornene.

The ethylene content of ethylene-alpha olefin-non-conjugated polyene terpolymers generally ranges from about 25% to about 85% by weight, preferably from about 30% to about 75% and more preferably from about 40% to about 70% by weight. The polyene content typically is below about 25%, preferably between about 2% to about 20% and more often from about 0.5% or about 1% to about 15% by weight.

The terpolymers are prepared by methods well known to those of skill in the art and are commercially available, for example those marketed by Uniroyal Chemical Co., Inc., Middlebury, Conn., USA, under the tradename TRILENE®. Specific examples include Trilene 67 and 68, terpolymers of ethylene, propylene and ethylidene norbornene (ENB), and Trilene 55 and 65, terpolymers of ethylene, propylene and dicyclopentadiene. Some typical characteristics of Trilene 67 and 68 are iodine number 19 and 6, ethylene/propylene/(ENB) (wt) 46/54/9.5 and 45/55/3, viscosity average molecular weight 7500 and 8000, and average C=C per molecule 5.6 and 1.9, respectively.

Relative amount of polyolefin and terpolymer reactants range from about 60 to about 99.5 parts by weight of polyolefin and about 0.5 to about 40 parts by weight terpolymer, often from about 75 to about 95.5 parts by weight polyolefin and from about 0.5 to about 25 parts by weight terpolymer per 100 parts of terpolymer and polyolefin.

The Carboxylic Reactant

The carboxylic reactant is at least one member selected from the group consisting of compounds of the formula $$R^3C(O)(R^4)_nC(O)OR^5 \quad (IV)$$

wherein each of $R^3$ and $R^5$ is independently H or a hydrocarbyl group, preferably H or lower alkyl, $R^4$ is a divalent hydrocarbylene group, and n is 0 or 1, and reactive sources thereof. Most preferably $R^3$ is H.

Reactive sources include compounds of the formula

(VI)

wherein each of $R^3$ and $R^5$ and each $R^9$ is independently H or a hydrocarbyl group, $R^4$ is a divalent hydrocarbylene group, and n is 0 or 1. These include acetals, ketals, hemiacetals and hemiketals of (IV) and esters thereof. Highly preferred are the compounds wherein one of $R^9$ is hydrocarbyl and one is H:

(V)

wherein each of $R^3$ and $R^5$ is independently H or a hydrocarbyl group, especially wherein the hydrocarbyl group is lower alkyl. $R^4$ is a divalent hydrocarbylene group, preferably lower alkylene, $R^9$ is hydrocarbyl, preferably lower alkyl, and n is 0 or 1, preferably 0. Especially preferred are the glyoxylate lower alkyl ester, lower alkyl hemiacetals. Cyclic trimers are useful.

The carboxylic reactant may be a compound of the formula

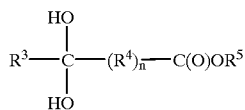
(VII)

wherein each of $R^3$ and $R^5$ is independently H or alkyl. Such compounds may arise when the carboxylic acid or ester reactant is hydrated.

$R^3$ is usually H or an aliphatic group, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from I to about 3 carbon atoms. The 'n' is 0 or 1; that is, in one embodiment $R^4$ is present and in another embodiment, $R^4$ is absent. More often, $R^4$ is absent.

When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl, especially methyl, ethyl, propyl and butyl.

Examples of carboxylic reactants are glyoxylic acid, and other omegaoxoalkanoic acids, glyoxylic acid hydrate, keto alkanoic acids such as pyruvic acid, levulinic acid, ketovaleric acids, ketobutyric acids, esters thereof, preferably the lower alkyl esters, methyl glyoxylate methyl hemiacetal, 4-formylbenzoic acid, 4-formylphenoxyacetic acid, esters thereof, carboxy benzaldehyde, the hemiacetals and hemiketals of keto- or aldehydoalkanoic acids such as glyoxylic acid and keto alkanoic acids such as pyruvic acid, levulinic acid, ketovaleric acids, and ketobutyric acids, and the corresponding acetals and ketals, and numerous others. The skilled. worker, having the disclosure before him, will readily recognize the appropriate carboxylic reactant (B) to employ to generate a given intermediate. Preferred carboxylic reactants are those that will lead to preferred products of this invention.

In a preferred embodiment, $R^3$ and one $R^9$ are hydrogen and the other $R^9$ and $R^5$ are methyl. In this preferred embodiment, the reactant is represented by the structure

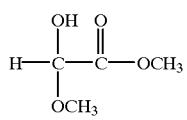

and known as glyoxylic acid methyl ester methylhemiacetal. It is marketed by DSM Fine Chemicals.

In one embodiment, the carboxylic composition of this invention is a mixture of hydrocarbon substituted carboxylic acylating agents, said mixture comprising (A) a polyolefin substituted carboxylic acylating agent; and (B) a terpolymer substituted carboxylic acylating agent; wherein (A) is prepared by reacting at least one polyolefin, and (B) is prepared by reacting at least one terpolymer; each individually, with at least one carboxylic reactant selected from the group consisting of compounds of the formula $R^3C(O)(R^4)_nC(O)OR^5$ (IV) wherein each of $R^3$ and $R^5$ is independently H or a hydrocarbyl group, $R^4$ is a divalent hydrocarbylene group, and n is 0 or 1, and reactive sources thereof.

In another embodiment, the carboxylic composition of this invention is the hydrocarbon substituted carboxylic acylating agent prepared by reacting a mixture of the polyolefin and the terpolymer with the at least one carboxylic reactant.

In yet another embodiment, the carboxylic composition of this invention is the hydrocarbon substituted carboxylic acylating agent prepared by reacting the polyolefin with the at least one carboxylic reactant, then adding to the reaction mixture the at least one terpolymer and optionally additional carboxylic reactant then reacting the mixture.

In each of the foregoing embodiments, the reaction is optionally conducted in the presence of an acidic catalyst.

The Catalyst

The polyolefin and the terpolymer may optionally be reacted with the carboxylic reactant in the presence of an acidic catalyst. Acid catalysts, such as organic sulfonic acids, for example, para-toluene sulfonic acid and methane sulfonic acid, heteropolyacids, the complex acids of heavy metals (e.g., Mo, W, Sn, V, Zr, etc.) with phosphoric acids (e.g., phosphomolybdic acid), and mineral acids, for example, $H_2SO_4$ and phosphoric acid, are useful. Solid acidic catalysts are useful. These include materials such as acidic clays, for example $H_2SO_4$ treated diatomaceous earth supplied under the name Super Filtrol, and polymer-bound acids such as those supplied under the name Amberlyst. Among useful solid catalysts are acidic oxides such as $H_2SO_4$ treated $TiO_2$ and $Al_2O_3$. The amount of catalyst used is generally small, ranging from about 0.01 mole % to about 10 mole %, more often from about 0.1 mole % to about 2 mole %, based on moles of olefinic reactant.

Carboxylic compositions of this invention may be prepared by a process comprising mixing together hydrocarbyl substituted carboxylic acylating agents obtained by reacting the at least one polyolefin and the at least one terpolymer, each individually, with the at least one carboxylic reactant. In an alternate embodiment, carboxylic compositions may be prepared by a process comprising reacting a mixture of the polyolefin and the terpolymer with the at least one carboxylic reactant. In each of these embodiments, the reaction is optionally conducted in the presence of an acidic catalyst. In one further embodiment, the carboxylic compositions are prepared by a process wherein the polyolefin is reacted with the at least one carboxylic reactant, then the at least one terpolymer is added to the reaction mixture and optionally, additional carboxylic reactant, then the mixture is reacted.

Amounts of reactants range from about 0.5, often from about 0.6 moles carboxylic reactant per mole of olefinic compounds up to 3 moles carboxylic reactant per equivalent of carbon to carbon double bonds in the combination of polyolefin and terpolymer. In one embodiment, from about 0.8 moles of carboxylic reactant are used per mole of olefinic compounds to about 1.2 moles carboxylic reactant per equivalent of olefins in the combination, even more often from about 0.95 moles carboxylic reactant per mole of said combination, to about 1.05 moles carboxylic reactant per equivalent of carbon to carbon double bonds in the combination of polyolefin and terpolymer. In another embodiment, more than 1.5 moles of carboxylic reactant, preferably from about 1.6 to 3 moles, are used per equivalent of carbon to carbon double bonds in the combination. In this embodiment, preferably from about 1.8 to about 2.5 moles carboxylic reactant are used per equivalent of carbon to carbon double bonds in the combination, more preferably from about 1.9 to about 2.1 moles carboxylic reactant per equivalent of carbon to carbon double bonds in the combination. When the polyolefin and terpolymer are reacted individually, each is reacted with the carboxylic reactant in amounts within this range.

An equivalent of carbon to carbon double bonds is defined herein as an Avogadro's number of double bonds, e.g., one mole of double bonds. For example, one mole of a monoolefinic compound (one containing one carbon to carbon double bond per molecule) has one equivalent of carbon to carbon double bonds. The equivalent weight of the monoolefinic compound is its molecular weight. A diene (a compound containing 2 carbon to carbon double bonds per molecule) has two equivalents of carbon to carbon double bonds. The equivalent weight of the diene is one half its molecular weight.

Equivalent weight of more complex materials such as polymers can be determined by techniques well known in the art, such as iodine number and bromine number. The magnitude of the iodine or bromine number is an indicator of $I_2$ or $Br_2$ reactive constituents in the molecule. For hydrocarbons, it is an indicator of the extent of unsaturation in the molecule. ASTM Procedure D-1159 is one of many describing such techniques for determining the extent of unsaturation in the molecule.

In a further embodiment, carboxylic acylating agents are prepared by a process comprising reacting the polyolefin with the at least one carboxylic reactant, then adding to the reaction mixture the at least one terpolymer and optionally additional carboxylic reactant then reacting the mixture.

In this particular embodiment, the initial charge of carboxylic reactant is from about 0.5 to 3 moles per equivalent of carbon to carbon double bonds in the combination of polyolefin and terpolymer, the polyolefin is reacted with no more than about 3 moles of carboxylic reactant per equivalent of carbon to carbon double bonds in the polyolefin, and the total charge of carboxylic reactant, including any optionally added carboxylic reactant, is from about 0.5 to about 3 moles, often from about 1 to about 1.5 moles, more often about 1 mole, per equivalent of carbon to carbon double bonds in the combination of polyolefin and terpolymer.

The carboxylic acylating agents of this invention may be used as additives to improve lubricating oil and fuel compositions. Lubricating oil compositions comprise a major amount of an oil of lubricating viscosity and a minor amount of the carboxylic composition. A major amount is defined herein as any amount greater than 50% by weight and a minor amount is any amount less than 50% by weight provided the total of all components is 100%.

The carboxylic composition is frequently incorporated into an additive concentrate comprising from about 10–80% by weight of the carboxylic composition and from 20–90% by weight of a substantially inert organic diluent, which additive concentrate is incorporated into an oil of lubricating viscosity in appropriate amounts to prepare lubricating oil compositions.

The carboxylic acylating agents of this invention may be further reacted with at least one reactant selected from the group consisting of (1) an amine characterized by the presence within its structure of at least one HN<group; (2) an alcohol; (3) a reactive metal or a reactive metal compound; and (4) a mixture of two or more of (1) through (3); the components of (4) being reacted with the carboxylic acylating agents simultaneously or sequentially, in any order, to form derivatives which are useful as dispersant-viscosity improvers for lubricating oils and as performance improving additives for fuels.

In one embodiment, the derivative comprises the carboxylic composition prepared from the mixture of acylating agents described hereinabove reacted with at least one of the reactants (1)–(4).

In another embodiment, the derivative comprises the carboxylic acylating agent prepared from the mixture of terpolymer and polyolefin reacted with at least one of the reactants (1)–(4).

In a further embodiment, the derivative comprises the carboxylic composition prepared by first reacting the polyolefin with the carboxylic reactant, adding the terpolymer and optionally, added carboxylic reactant, continuing the reaction, then reacting the carboxylic acylating agent obtained thereby with at least one of reagents (1)–(4).

The derivative may be prepared by a process comprising reacting a mixture of carboxylic acylating agents obtained by reacting at least one polyolefin and at least one terpolymer, each individually, with at least one carboxylic reactant selected from the group consisting of compounds of the formula $R^3C(O)(R^4)_nC(O)OR^5$ (IV) wherein each of $R^3$ and $R^5$ is independently H or a hydrocarbyl group, $R^4$ is a divalent hydrocarbylene group, and n is 0 or 1, and reactive sources thereof, with at least one of the reactants selected from the group consisting of reactants (1)–(4).

In another embodiment, a derivative may be prepared by a process comprising reacting a carboxylic composition obtained by reacting a mixture of a polyolefin and a terpolymer with the at least one carboxylic reactant and reactive sources thereof with at least one of the reactants selected from the group consisting of reactants (1)–(4).

In yet another embodiment, the derivative is prepared by a process comprising first reacting the polyolefin with the at least one carboxylic reactant, then adding the terpolymer and optionally, additional carboxylic reactant, then reacting the carboxylic acylating agent obtained thereby with at least one of the reactants selected from the group consisting of reactants (1)–(4).

In still another embodiment, the derivative is prepared by a process comprising reacting each carboxylic acylating agent obtained by reacting the at least one polyolefin and the at least one terpolymer, individually, with the at least one carboxylic reactant, each individually, with at least one of the reactants selected from the group consisting of reactants (1)–(4), then combining the products obtained thereby.

The derivatives may be used as additives, particularly as viscosity improving dispersants, to improve lubricating oil compositions, and in fuel compositions. Lubricating oil compositions comprise a major amount of an oil of lubricating viscosity and a minor amount of the carboxylic composition.

The derivatives are frequently incorporated into an additive concentrate comprising from about 10–80% by weight of the carboxylic composition and from 20–90% by weight of a substantially inert organic diluent, which additive concentrate is incorporated into an oil of lubricating viscosity in appropriate amounts to prepare lubricating oil compositions.

(1) The Amine Reactant

Suitable amine reactants, as defined herein, include ammonia, hydrazines, monoamines or polyamines. These reactants must contain at least one N—H group. The amines may be aliphatic, cycloaliphatic, aromatic and heterocyclic.

The monoamines generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary monoamines do not possess an N—H group.

In another embodiment, the monoamine may be a hydroxyamine. Typically, the hydroxyamines are primary or secondary alkanolamines or mixtures thereof. As stated above, tertiary monoamines do not possess an N—H group; however, tertiary alkanol monoamines sometimes can react to form a tertiary amino group containing ester. Alkanol amines that possess an N—H group can be represented, for example, by the formulae:

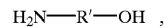

and

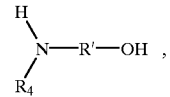

wherein each $R^4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R^4$ is independently a methyl, ethyl, propyl, butyl, pentyl or hexyl group.

Examples of alkanolamines include mono-, di-, and triethanolamine, diethylethanolamine, ethylethanolamine, butyldiethanolamine, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxyhydrocarbyl) amines can be conveniently prepared, for example, by reaction of epoxides with aforedescribed amines and can be represented by the formulae:

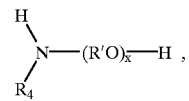

wherein x is a number from about 2 to about 15 and $R_4$ and R' are as described above. $R_4$ may also be a hydroxypoly (hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM produced and marketed by Sea Land Chemical Co., Westlake, Ohio.

The amine may also be a polyamine. The polyamine may be aliphatic, cycloaliphatic, heterocyclic or aromatic. Examples of the polyamines include alkylene polyamines, hydroxy containing polyamines, polyoxyalkylene polyamines, arylpolyamines, and heterocyclic polyamines.

Alkylene polyamines are represented by the formula

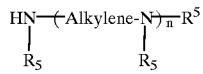

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_5$ is independently hydrogen or an aliphatic or hydroxy-substituted aliphatic group of up to about 30 carbon atoms. Preferably $R_5$ is H or lower alkyl, most preferably, H.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, trimethylene diamine, tripropylene tetramine, tetraethylene pentamine, hexaethylene heptamine, pentaethylenehexamine, dimethylaminopropyl-amine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading Ethylene Amines in Kirk Othmer's "Encyclopedia of Chemical Technology", 4th Edition, Vol. 8, pages 74–108, Interscience Publishers, New York (1993). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Texas, designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine), 0.72% triethylenetetramine, 21.74% tetraethylene pentamine and 76.61% pentaethylene hexamine and higher (by weight). Another example of polyamine bottoms is one having an equivalent weight of 40.5 based on % N, sold as HPA-X by Union Carbide. These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl) amine, tris-(hydroxymethyl)amino methane, 2-amino-2-methyl-1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making.

In another embodiment, the polyamines are hydroxy-containing polyamines. Hydroxy-containing polyamine analogs of hydroxy monoamines, particularly alkoxylated alkylenepolyamines can also be used. Such polyamines can be made by reacting the above-described alkylene amines with one or more of the above-described alkylene oxides. Similar alkylene oxide-alkanolamine reaction products can also be used such as the products made by reacting the aforedescribed primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylene-pentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Suitable amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae: $NH_2$-Alkylene (O-Alkylene)$_m NH_2$, wherein m has a value of about 3 to 70 and preferably about 10 to 35; and R(Alkylene (O-Alkylene)$_n NH_2$)$_{3-6}$, wherein n is from about 1 to 40 with the proviso that the sum of all of the n values is from about 3 to about 70 and generally from about 6 to about 35 and R is a polyvalent saturated hydrocarbon group of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The preferred polyoxyalkylene polyamines include the polyoxyethylene and polyoxypropylene diamines and the polyoxypropylene triamines having average molecular weights ranging from about 200 to 4000 or from about 400 to about 2000. The polyoxyalkylene polyamines are commercially available an may be obtained, for example, from the Texaco Company, Inc. under the trade names "Jeffamines D-230, D-400, D-1000, D-2000, T-403, etc.".

U.S. Pat. Nos. 3,804,763 and 3,948,800 are expressly incorporated herein by reference for their disclosure of such polyoxyalkylene polyamines and process for acylating them with carboxylic acid acylating agents which processes can be applied to their reaction with the carboxylic compositions of the present invention.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkylmorpholines, N-aminoalkylthiomorpholines, N-aminoalkylpiperazines, N,N'-bis-aminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkyl substituted piperidines, piperazine, aminoalkyl substituted piperazines, for example, aminoethylpiperazine, morpholine, aminoalkyl substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-amino-propylmorpholine, N-aminoethylpiperazine, and N,N'-diaminoethyl-piperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly (ethylene/propylene)amine, (50:50 mole ratio of monomers); poly-butene amine; N,N-di(hydroxyethyl)-N-polybutene amine; N-(2-hydroxypropyl)-N-polybutene amine; N-polybutene-aniline; N-polybutene-morpholine; N-poly(butene) ethylenediamine; N-poly(propylene)tri-methylenediamine; N-poly(butene)diethylene-triamine; N',N'-poly(butene) tetraethylenepentamine; N,N-dimethyl-N'-poly(propylene)-1,3-propylenediamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by an n (number average molecular weight) value of at least about 500. Generally, the polyalkene substituted amine is characterized by an n value of about 500 to about 5000, preferably about 800 to about 2500. In another embodiment n varies between about 500 to about 1200 or 1300.

As noted hereinabove, ammonia and hydrazines having at least one N—H group are also useful. Preferably there are at least two hydrogens bonded directly to hydrazine nitrogen and, more preferably, both hydrogens are on the same nitrogen. Substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethyl-hydrazine, N,N'-dimethylhydrazine, phenylhydrazine, N-phenyl-N'-ethylhydrazine, N-phenyl-N'-cyclohexylhydrazine, and the like.

The carboxylic derivative compositions produced by reacting the carboxylic acylating agents of the invention and the amines described above are acylated amines which may include, for example, amine salts, amides, imides and imidazolines as well as mixtures thereof. To prepare the carboxylic derivative compositions from the amines, one or more of the carboxylic acylating agents and one or more amines are heated, optionally in the presence of a normally liquid, substantially inert organic liquid solvent/diluent, at temperatures in the range of from about 80° C. up to the decomposition point, i.e., the temperature at which any of the reactants or the product begins to decompose. Normally, temperatures in the range of from about 100° C. up to about 300° C. are used, provided 300° C. does not exceed the decomposition point. Temperatures of about 125° C. to about 250° C. are normally used.

The carboxylic acylating agent and the amine are reacted in an amount sufficient to provide from about one-half equivalent up to two moles of amine per equivalent of the carboxylic acylating agent. In another embodiment, the carboxylic acylating agent is reacted with from about one-half equivalent up to one mole of amine per equivalent of the carboxylic acylating agent.

For the purpose of this invention, an equivalent of amine is that amount of amine corresponding to the total weight of amine divided by the total number of nitrogens present. Thus, octyl amine has an equivalent weight equal to its molecular weight; ethylenediamine has an equivalent weight equal to one-half its molecular weight, and aminoethylpip-erazine has an equivalent weight equal to one-third of its molecular weight.

The number of equivalents of acylating agent depends on the number of carboxylic functions present in the acylating agent. Conventional techniques are available for determining the number of carboxylic functions (e.g., acid number, saponification number, etc.) and thus, the number of equivalents of acylating agent available to react with amine.

U.S. Pat. Nos. 3,172,892; 3,219,666; 3,272,746, and 4,234,435 are expressly incorporated herein by reference for their disclosure with respect to the procedures applicable to reacting the carboxylic acylating agents of this invention with the amines as described above. In applying the disclosures of these patents to the carboxylic acylating agents of the present invention, the latter can be substituted for the high molecular weight carboxylic acid acylating agents disclosed in these patents on an equivalent basis.

(2) The Alcohol Reactant

Alcohols useful for preparing carboxylic derivative compositions of this invention from the carboxylic acylating agents previously described include those compounds of the general formula

wherein $R_3$ is a monovalent or polyvalent organic radical joined to the —OH groups through carbon-to-oxygen bonds (that is,

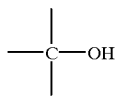

wherein the carbon is not part of a carbonyl group) and m is an integer of from 1 to about 10, usually 2 to about 6. As with the amine reactant, the alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted aromatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the mono- and polyhydric alcohols corresponding to the above formula will usually contain not more than about 40 carbon atoms and generally not more than about 20 carbon atoms. The alcohols may contain non-hydrocarbon substituents of the same type mentioned with respect to the amines above, that is, non-hydrocarbon substituents which do not interfere with the reaction of the alcohols with the acylating agents of this invention. In general, polyhydric alcohols are preferred.

The monohydric and polyhydric alcohols include monohydroxy and polyhydroxy aromatic compounds. Monohydric and polyhydric phenols and naphthols are preferred hydroxyaromatic compounds. Usually, the hydroxy aromatic compound will contain 1 to 4 hydroxy groups. Aromatic hydroxy compounds are illustrated by the following specific examples: phenol, beta-naphthol, cresols, resorcinol, catechol, p,p'-dihydroxybiphenyl, 2,4-dibutylphenol, propenetetramer-substituted phenol, 4,4'-methylene-bis-phenol, polyisobutenyl—(molecular weight of about 1000)—substituted phenol, the condensation product of heptylphenol with 0.5 mole of formaldehyde, the condensation product of octylphenol with acetone, di(hydroxyphenyl)oxide, di(hydroxyphenyl)sulfide and 4-cyclohexylphenol. Phenol itself and aliphatic hydrocarbon-substituted phenols, e.g., alkylated phenols having up to 3 aliphatic hydrocarbon substituents are especially preferred.

Monohydric aliphatic and cycloaliphatic alcohols include methanol, ethanol, isooctanol, cyclohexanol, behenyl alcohol, neopentyl alcohol, benzyl alcohol, monobutyl ether of ethylene glycol, monooleate of ethylene glycol, tert-butyl alcohol, and dioleate of glycerol. Alcohols may be unsaturated such as allyl alcohol, cinnamyl alcohol, 1-cyclohexene-3-ol and oleyl alcohol.

Other specific alcohols are the ether alcohols and amino alcohols including, for example, the oxyalkylene, oxyarylene-, amino-alkylene-, and aminoarylene-substituted alcohols having one or more oxyalkylene, aminoalkylene or amino-aryleneoxy-arylene groups. They are exemplified by Cellosolve, carbitol, phenoxyethanol, aminoethanol, p-aminophenol, and the like.

The polyhydric alcohols preferably contain from 2 to about 10 hydroxy groups. They are illustrated, for example, by the alkylene glycols and polyoxyalkylene glycols, glycerol, monooleate of glycerol, pentaerythritol, erythritol, sorbitol, and xylene glycol. Carbohydrates such as sugars, starches and so forth likewise can be used.

Polyhydric alcohols having at least 3 hydroxyl groups, some, but not all of which have been esterified with an aliphatic monocarboxylic acid having from about 8 to about 30 carbon atoms are useful.

A preferred class of alcohols is that containing up to about 12 carbon atoms, and especially those containing 3 to 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, guinic acid, 2,2,6,6-tetrakis-(hydroxymethyl)cyclohexanol, 1,10-decanediol, and the like. Aliphatic alcohols containing at least three hydroxyl groups and up to 10 carbon atoms are particularly preferred, especially polyhydric alkanols containing 3 to 10 carbon atoms and particularly, 3 to 6 carbon atoms and having at least three hydroxyl groups. Such alcohols are exemplified by glycerol, erythritol, pentaerythritol, mannitol, sorbitol, 2-hydroxymethyl-2-methyl-1,3-propanediol (trimethylolethane), 2-hydroxymethyl-2-ethyl-1,3-propanediol(trimethylpropane), 1,2,4-hexanetriol, and the like.

From what has been stated above, it is seen that the amine reactant may contain alcoholic hydroxy substituents and the alcohol reactant can contain primary, secondary, or tertiary amino substituents. Thus, amino alcohols can fall into both classes provided they contain at least one primary or secondary amino group. If only tertiary amino groups are present, the amino alcohol belongs only to the class of alcohols.

The alcohols may be polyoxyalkylene alcohols and derivatives thereof such as hydrocarbyl ethers thereof. Such polyoxyalkylene alcohols may be prepared by reacting, for example, a hydroxy-substituted compound, $R_4(OH)_q$ wherein q is 1 to 6, preferably 2 to 3, and $R_4$ is a residue of a mono- or polyhydric alcohol or mono- or polyhydroxy phenol, naphthol, etc., reacted with an alkylene oxide such as

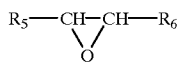

to form a hydrophobic base, $R_5$ being a lower alkyl group of up to 4 carbon atoms, $R_6$ being hydrogen or the same as $R_5$ with the proviso that the alkylene oxide does not contain in excess of 10 carbon atoms. This base is then reacted with ethylene oxide to provide a hydrophilic portion resulting in a molecule having both hydrophobic and hydrophilic portions. Compounds illustrative of $R_4$—$(OH)_q$ include aliphatic polyols such as alkylene glycols and alkane polyols such as ethylene glycol, propylene glycol, trimethylene glycol, glycerol, pentaerythritol, sorbitol, etc., and aromatic hydroxy compounds such as alkylated mono- and polyhydric phenols and naphthols such as cresol, heptylphenols, dodecylphenols, resorcinols, etc. The polyoxyalkylene alcohols and other alcohols useful in the process of the present invention are described in more detail in U.S. Pat. No. 4,234,435 (Meinhardt et al) in Cols. 29–32 and that disclosure is hereby incorporated by reference.

The carboxylic derivative compositions produced by reacting the carboxylic acylating agents of this invention with alcohols are esters. Both acidic esters and neutral esters are contemplated as being within the scope of this invention. Acidic esters are those in which some of the carboxylic acid functions in the acylating agents are not esterified but are present as free carboxyl groups. Obviously, acid esters are easily prepared by using an amount of alcohol insufficient to esterify all of the carboxyl groups in the carboxylic acylating agents of this invention.

The acylating agents of this invention are reacted with the alcohols according to conventional esterification techniques. This normally involves heating the acylating agent of this invention with the alcohol, optionally in the presence of a normally liquid, substantially inert, organic liquid solvent/diluent and/or in the presence of esterification catalyst. Temperatures of at least about 100° C. up to the decomposition point are used (the decomposition point having been defined hereinbefore). This temperature is usually within the range of about 100° C. up to about 300° C. with temperatures of about 140° C. to 250° C. often being employed. Usually, at least about one-half equivalent of alcohol is used for each equivalent of acylating agent. An equivalent of acylating agent is the same as discussed above with respect to reaction with amines. An equivalent of alcohol is its molecular weight divided by the total number of hydroxyl groups present in the molecule. Thus, an equivalent weight of ethanol is its molecular weight while the equivalent weight of ethylene glycol is one-half its molecular weight.

Many issued patents disclose procedures for reacting high molecular weight carboxylic acid acylating agents with alcohols to produce acidic esters and neutral esters. These same techniques are applicable to preparing esters from the acylating agents of this invention and the alcohols described above. All that is required is that the acylating agents of this invention is substituted for the high molecular weight carboxylic acid acylating agents discussed in these patents, usually on an equivalent weight basis. The following U.S. patents are expressly incorporated herein by reference for their disclosure of suitable methods for reacting the acylating agents of this invention with the alcohols described above: U.S. Pat. Nos. 3,331,776; 3,381,022; 3,522,179; 3,542,680; 3,697,428; 3,755,169, and 4,234,435.

(3) The Reactive Metal or Reactive Metal Compound

Reactive metals or reactive metal compounds are those which will form carboxylic acid metal salts with the carboxylic acylating agents of this invention and those which will form metal-containing complexes with the carboxylic derivative compositions produced by reacting the acylating agents with amines and/or alcohols as discussed above. An extensive listing of useful metals and metal compounds appears in U.S. Pat. Nos. 3,163,603 and 3,271,310. Reactive metal compounds for the formation of complexes with the reaction products of the acylating agents of this invention and amines are disclosed in U.S. Pat. No. 3,306,908. Complex-forming metal reactants are those of the so-called transition or coordination metals, i.e., they are capable of forming complexes by means of their secondary or coordination valence.

U.S. Pat. Nos. 3,163,603, 3,271,310 and 3,306,908 are expressly incorporated herein by reference. Basically, processes disclosed in these references are applicable to the carboxylic derivative compositions of the acylating agents of this invention with the amines as described above by substituting, or on an equivalent basis, the acylating agents of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908.

Reaction products prepared by reacting the carboxylic acylating agents with an amine as described hereinabove may be post treated by contacting the compositions thus formed with one or more post-treating reagents selected from the group consisting of boron oxide, boron oxide hydrate, boron halides, boron acids, esters of boron acids, carbon disulfide, sulfur, sulfur chlorides, alkenyl cyanides, carboxylic acid acylating agents, aldehydes, ketones, urea, thiourea, guanidine, dicyanodiamide, hydrocarbyl phosphates, hydrocarbyl phosphites, hydrocarbyl thiophosphides, phosphorous oxides, phosphoric acid, hydrocarbyl thiocyanates, hydrocarbyl isocyanates, hydrocarbyl isothiocyanates, epoxides, episulfides, formaldehyde or formaldehyde-producing compounds plus phenols and sulfur plus phenols. The same post-treating reagents are used with carboxylic derivative compositions, prepared from the carboxylic acylating agents of this invention and a combination of alcohols and amines. However, when the carboxylic derivative compositions of this invention are derived from alcohols and the carboxylic acylating agents, that is, when they are acidic or neutral esters, the post-treating reagents are usually selected from the group consisting of boron oxide, boron oxide hydrate, boron halides, boron acids, esters of boron acids, sulfur, sulfur chlorides, phosphorous sulfides, phosphorous oxides, carboxylic acid acylating agents, epoxides and episulfides.

Since post-treating processes involving use of these post-treating reagents is known insofar as application to reaction products of high molecular weight carboxylic acylating agents of the prior art and amines and/or alcohols, detailed descriptions of these processes herein is unnecessary. In order to apply the prior art processes to the carboxylic derivative compositions of this invention, all that is necessary is that reaction conditions, ratio of reactants, and the like as described in the prior art be applied to the novel carboxylic derivative compositions of this invention. U.S. Pat. No. 4,234,435 is incorporated herein by reference for disclosure of post-treated dispersants formed from the reaction of acylating agents with amines, alcohols and metallic compositions as described hereinabove. The reader is also referred to the section entitled Other Additives, part (4) thereof, set forth hereinafter for an extensive listing of U.S. patents relating to post-treated carboxylic amine or Mannich dispersants.

The following examples are intended to illustrate several compositions of this invention as well as means for preparing same. It is to be understood that these examples are not intended to limit the scope of the invention. Unless indicated otherwise all parts are parts by weight, temperatures are in degrees Celsius, and pressures in millimeters mercury (mm Hg). Any filtrations are conducted using a diatomaceous earth filter aid. Analytical values are obtained by actual analysis.

EXAMPLE 1a

A reactor is charged with 1000.9 parts of polyisobutene (Glissopal 2300, BASF) having 85% vinylidene content and a number average molecular weight of 2206 based on gel

EXAMPLE 1b (continued from previous page)

permeation chromatography, 100.8 parts of an ethylene-propylene-diene copolymer (Trilene 67, Uniroyal) having an equivalent weight of 1051 based on bromine number, and several drops of a kerosene solution of a polydimethylsiloxane antifoaming agent. The materials are heated under nitrogen atmosphere to 135° C., and a mixture of 85.8 parts of the methyl ester-methyl hemiacetal of glyoxylic acid (GMHA), having molecular weight of 120, and 2.45 parts of 70% solution of methanesulfonic acid in water, are added over 0.25 hour at 109 to 128° C. The materials are held at 135° C. for 6 hours. The reacted materials are filtered near 135° C. through diatomaceous earth. The filtrate has a saponification number of 26.5.

EXAMPLE 1b

A reactor is charged with 301.6 parts of the filtrate from Example 1a having an equivalent weight of 2118 based on a saponification number of 26.5 and 206.5 parts of mineral oil diluent. The materials are heated under nitrogen atmosphere to 110° C., and 12.1 parts of polyethylenepolyamine bottoms, having an equivalent weight 42.4 based on a 33% N content, are added over 0.3 hour at 110° C. The materials are heated to 160° C., and held at 160° C. for 5 hours. The reacted materials are filtered near 160° C. through diatomaceous earth. The filtrate contains 0.75%N.

EXAMPLE 2a

A reactor as in Example 1a is charged with 1000.9 parts of the polyisobutene and 50.21 parts of the ethylene-propylene-diene copolymer, each described in Example 1a, and several drops of a kerosene solution of a polydimethylsiloxane antifoaming agent. The materials are heated under nitrogen atmosphere to 100° C., and a mixture of 78.3 parts of the methyl ester-methyl hemiacetal of glyoxylic acid and 2.25 parts of 70% solution of methanesulfonic acid in water are added dropwise over 0.2 hour. The temperature is increased to 135° C. and is maintained at 135° C. for 6 hours. The reacted materials are filtered near 135° C. through diatomaceous earth. The filtrate has a saponification number of 26.56.

EXAMPLE 2b

The procedure of Example 1b is followed with 300 parts of the product of Example 2a, 205 parts mineral oil, and 12.05 parts of the polyethylene polyamine. The product contains 0.69% N.

EXAMPLE 3a

A reactor equipped for stripping of the contents is charged with 64.23 parts 50% aqueous glyoxylic acid followed by stripping off water at 75° C. at 100 mm Hg for 0.6 hour, then at 90 mm Hg for 0.25 hour, 80 mm Hg for 0.25 hour, and 70 mm Hg for 0.25 hour. The reactor is then equipped as in Example 1a. To the stripped materials are added 475 parts polyisobutene (Glissopal ES 3252, BASF) having $M_n$ about 2400 and containing about 70 mole percent terminal vinylidene groups and 25 parts of the ethylene propylene-diene copolymer of Example 1a. The materials are heated to 85° C. to enable stirring whereupon 2 parts 70% aqueous methane sulfonic acid are added. An $N_2$ purge is begun, the temperature is increased to 160° and is maintained for 2 hours. The materials are mixed with 131.3 parts mineral oil diluent. The product has saponification number=36.76 and contains 12.7% unreacted polyisobutylene (Thin layer chromatography (TLC)–Flame Ionization detector (FID)).

EXAMPLE 3b

A reactor is charged with 310.5 parts of the product of Example 3a and 111.7 parts mineral oil. The temperature is increased to 100° C. with $N_2$ whereupon 12.35 parts of an ethylene polyamine mixture containing an average of 34% N are added over 0.2 hour. The temperature is maintained for 0.3 hour, is increased to 160° C. and is then maintained for 5 hours. The materials are filtered. The filtrate contains 0.81% N.

EXAMPLE 4

The procedure of Example 3b is followed using 300 parts of the product of Example 3a, 9.56 parts amine and 106.4 parts oil. The filtrate contains 0.68% N.

EXAMPLE 5a

The procedure of Example 3a is repeated except the product is filtered. Saponification no=22.13.

EXAMPLE 5b

The procedure of Example 3b is repeated with 339.3 parts of the product of Example 5a, 10.9 parts of the amine, and 120.3 parts oil. The filtrate contains 0.74% N.

EXAMPLE 6

The procedure of Example 5b is repeated with 300 parts of the product of Example 5a, 7.17 parts amine and 104.8 parts oil. The filtrate contains 0.62% N.

EXAMPLE 7a

A reactor equipped for stripping is charged with 500.4 parts 50% aqueous glyoxylic acid which is then stripped as described in Example 3a. The reactor is then equipped as in Example 1a whereupon 3060 parts of Glissopal ES3252 and 540 parts Trilene 67 are added. The materials are heated to 110° C. at which time the materials can be stirred. To the materials are added 4.1 parts 70% aqueous methane sulfonic acid and $N_2$ purge is begun. The materials are heated to 160° C. and the temperature is maintained for 3 hours. The mixture is beginning to become too viscous to stir; a total of 5757 parts mineral oil are added to facilitate stirring. The temperature is maintained at 160° for 5 hours, then the materials are filtered. The filtrate has saponification number 14.87.

EXAMPLE 7b

A reactor is charged with 618 parts of the product of Example 7a which is then heated to 105° C. $N_2$ blowing is begun, 28.1 parts of the amine of Example 3b is added over 0.2 hour, and after 0.3 hours the temperature is increased to 160° C. The temperature is maintained for 5 hours then the materials are filtered. The filtrate contains 1.3% N.

EXAMPLE 8a

A reactor arranged for stripping of the contents is charged with 109.7 parts 50% aqueous glyoxylic acid which is then in increments as in Example 3a except the final increment is at 60 mn Hg for 0.3 hour. The reactor is then equipped as in Example 1a. To the stripped materials are added 30 parts Trilene 67, 525 parts Glissopal ES3252 and 45 parts of a 30 centistokes polybutene synthetic fluid (Amoco L-14). The materials are heated until they can be stirred (100° C.) and 2 parts 70% aqueous methane sulfonic acid are added. $N_2$ blowing is begun, the temperature is increased to 160° C. and is maintained for 2.5 hours. The materials are mixed with 162.6 parts mineral oil and filtered. The filtrate has saponification number of 30.03.

EXAMPLE 8b

The procedure of Example 3b is repeated with 350 parts of the product of Example 8a, 11.4 parts of the amine, and 124.3 parts mineral oil. The filtrate contains 0.84% N.

EXAMPLE 9

The procedure of Example 8b is repeated with 315.08 parts of the product of Example 8a, 13.69 parts of the amine and 114.18 parts of mineral oil. The filtrate analyzed as containing 1.57% N (Theory=1.07% N).

EXAMPLE 10a

A reactor is charged with 475 parts polyisobutylene (Ultravis 10, BP Chemicals) having $\overline{M}_n$ about 1000 and containing about 80 mole % terminal vinylidene groups, 25 parts Trilene 67 and 1 part 70% aqueous methane sulfonic acid. The materials are mixed and heated to 155° C. and 8 drops of a kerosene solution of a silicone antifoam agent are added. While maintaining 155° C., 95 parts of 50% aqueous glyoxylic acid are added dropwise over 4 hours. The temperature is increased to 160° C. and is maintained for 4 hours. The materials are mixed with 134 parts mineral oil and filtered. The filtrate has saponification no. 42.

EXAMPLE 10b

A reactor is charged with 250 parts of the product of Example 10a and 206 parts mineral oil, then the materials are mixed and heated, under $N_2$, to 100° C. To the heated mixture are added 11.5 parts HPA-X polyamine bottoms followed by mixing for 0.5 hour. The temperature is increased to 165° C. and is maintained for 5 hours. The materials are then filtered. Filtrate contains 0.85% N.

The following is a comparative example of a dispersant prepared by reacting polyisobutylene with the carboxylic reactant to form an intermediate, then reacting the intermediate with polyethylene polyamine bottoms. This comparative dispersant does not contain groups derived from terpolymers. Results of testing of the comparative dispersant is presented hereinafter.

Comp 1

A reactor is charged with 1042.8 parts of Glissopal 2300, 74.04 parts of GMHA, 2.17 parts 70% aqueous methane sulfonic acid, and 10 drops of a silicone antifoam agent. The materials are heated to 135° C., under No. The temperature is maintained for 6 hours then the materials are filtered. Another reactor is charged with 303.02 parts of this filtrate which is heated to 110° C. under $N_2$. To the heated materials are added, over 0.25 hour, 10.08 parts of polyethylenepolyamine bottoms, having an equivalent weight 42.4 based on a 33% N content. The materials are heated to 160° C. and are held at that temperature for 5 hours. The materials are filtered. The filtrate contains 0.55% N.

The Oil of Lubricating Viscosity

The lubricating compositions of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, III, U.S. Pat. No. 4,326,972, European Patent Publication 107,282, and A. Sequeria, Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, lubricating oil compositions of this invention may contain other components. The use of such additives is optional and the presence thereof in the compositions of this invention will depend on the particular use and level of performance required. Thus the other additive may be included or excluded. The compositions may comprise a zinc salt of a dithiophosphoric acid. Zinc salts of dithiophosphoric acids are often referred to as zinc dithiophosphates, zinc O,O'-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, pour point depressing agents, extreme pressure agents, anti-wear agents, color stabilizers and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are often included in the lubricating oils described herein. See for example, page 8 of 'Lubricant Additives" by C.V. Smalheer and R. Kennedy Smith (Lezius-Hiles Company Publisher, Cleveland, Ohio, 1967). Pour point depressants, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | 5,696,060 |
| 3,351,552 | 3,541,678 | 5,696,067 |
| | | RE 26,433 |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitrites, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0,1% to about 10% by weight, more often up to about 5% by weight.

The various additives described herein can be added directly to the lubricant. Preferably, however, they are diluted with a substantially inert, normally liquid organic diluent such as mineral oil, naphtha, benzene, toluene or xylene, to form an additive concentrate. Preferred additive concentrates contain the diluents referred to hereinabove. These concentrates usually comprise about 0.1 to about 80% by weight of the compositions of this invention and may contain, in addition, one or more other additives known in the art or described hereinabove. Concentrations such as 15%, 20%, 30% or 50% or higher may be employed. The following examples illustrate additive concentrates of this invention. All parts are parts by weight and are amounts on a neat, that is, diluent free, basis, except that when products of this invention are used, they are listed as prepared, with no adjustment for diluent content.

These examples are presented for illustrative purposes only, and are not intended to limit the scope of this invention. The expression MR refers to metal ratio, the number of equivalents of metal present compared to the number of equivalents that is present for the stoichiometrically neutral product.

EXAMPLES A–B

Additive concentrates are prepared by mixing at an elevated temperature, 7.6 parts of a Zn salt of mixed di-secondary alkyl dithiophosphate, 5.45 parts di(alkylphenyl) amine, 2.73 parts sulfurized isobutylene, 1 part Na overbased (MR 16) polyolefin ($\overline{M}_n$~1000) substituted succinic anhydride, 2.04 parts Ca overbased (MR 11) alkylbenzene sulfonate, 1.55 parts Mg overbased (MR 14.7) alkyl benzene sulfonate, 2.83 parts Ca overbased (MR 2.3) sulfur-coupled alkyl phenol, 0.08 part of a kerosene solution of a silicone antifoam agent, 40.91 parts of the indicated product of this invention and sufficient mineral oil diluent to prepare 100 parts of concentrate:

| Example | Product of Example No. |
|---|---|
| A | 1b |
| B | 2b |

EXAMPLES C–D

Additive concentrates are prepared by mixing at an elevated temperature, 9.2 parts of a polyolefin ($\overline{M}_n$~1000) substituted succinic anhydride-polyethylene polyamine mixture reaction product, 5.81 parts Zn salt of mixed di-secondary alkyl dithiophosphate, 3.54 parts sulfurized diene-acrylate Diels-Alder adduct, 1.53 parts di(alkylphenyl) amine, 4.03 parts Ca overbased (MR 12) sulfur coupled alkylphenol), 1.65 parts Mg overbased (MR 14.7) alkylbenzene sulfonate, 6.35 parts Ca overbased (MR 3.5) sulfur coupled alkyl phenol, 2.08 parts t-butylated alkyl phenol, 0.06 part kerosene solution of silicone antifoam agent, 31.74 parts of the indicated product of this invention, and mineral oil to bring the total to 100 parts concentrate.

| Example | Product of Example No. |
|---|---|
| C | 1b |
| D | 2b |

A comparative additive concentrate is prepared as in Examples A–B, above, replacing the products of the listed examples of this invention with 40.91 parts of the product of the listed comparative example.

| Example | Product of Example No. |
|---|---|
| Comp A | Comp 1 |

A comparative additive concentrate is prepared as in Examples C–D, above, replacing die products of the listed examples of this invention with 31.74 parts of the product of the listed comparative examples.

| Example | Product of Example No. |
|---|---|
| Comp B | Comp 1 |

Lubricating compositions of this invention are illustrated by the following Examples. These example are presented for illustrative purposes only and are not intended to limit the scope of this invention. The lubricating compositions are prepared by combining the specified ingredients, individually or from concentrates, in the indicated amounts and oil of lubricating viscosity to make the total 100 parts by weight. The amounts shown are indicated as parts by weight. Unless indicated otherwise, where components are indicated as parts by weight, they are amounts of chemical present on an oil-free basis. Thus, for example, an additive comprising 50% oil used at 10% by weight in a blend, provides 5% by weight of chemical. Where oil or other diluent content is given, it is for information purposes only and does not indicate that the amount shown in the table includes oil. Amounts of products of examples of this invention include oil content, if any.

The effect of the additives is illustrated by the data in the tables. Viscosities are determined employing the procedure set out in ASTM Standard D-445 and the viscosity index is determined employing the procedure set out in ASTM Standard D-2270. ASTM Procedure D-445 covers, in general, the determination of kinematic viscosity of liquid petroleum products by measuring the time for a volume of liquid to flow under gravity through a calibrated glass capillary viscometer. These are reported in terms of centistokes, (abbreviated cSt). ASTM Procedure D-2270 provides a means for calculating Viscosity Index. Apparent viscosities are determined employing ASTM Procedure D-5293, Apparent Viscosities of Engine Oils Between –5 and –30° C. Using the Cold-Cranking Simulator and ASTM Procedure 4684, for temperatures between −15 and −35° C., as indicated. Apparent viscosities are reported in terms of centipoise (abbreviated cP) All of these Procedures appear in the Annual Book of ASTM Standards, Section 5, Petroleum Products. Lubricants and Fossil Fuels, ASTM, 1916 Race Street, Philadelphia, Pa., USA.

EXAMPLE I–II

These Examples illustrate SAE 5W-30 engine oil compositions of this invention. They contains 11% of the indicated additive concentrate of this invention, 7.5% by weight of a 9% in oil solution of an olefin copolymer viscosity improver, 0.2% of Viscoplex® 1-330 (identified as a 50% in oil solution of a polymethacrylate pour point depressant, obtained from Rohm GMBH), in a mineral oil basestock made up of 95% 100 Neutral oil and 5% of 150 Neutral oil.

TABLE I

| Example | Additive Concentrate | Kinematic Viscosity (cSt) 100° C. | 40° C. | VI | Apparent Viscosity (centipoise) D5293 (−25° C.) |
|---|---|---|---|---|---|
| I | A | 10.24 | 59.85 | 160 | 2,850 |
| II | B | 9.46 | 54.89 | 157 | 2,850 |

SAE J300 Standard for 5W-30 Engine Oils:
9.3 < cSt @ 100° C. < 12.5; cP @ −25° C. < 3500;

EXAMPLE II

These Examples illustrate SAE 10W-40 engine oil compositions of this invention. They contain 14.4% of the indicated additive concentrates, 9.3% of a 12.5% in oil solution of an olefin copolymer viscosity improver, and 0.25% of a polymethacrylate pour point depressant in a mineral oil basestock made up of 30% 90 Neutral oil and 70% 150 Neutral oil.

TABLE II

| Example | Additive Concentrate | Kinematic Viscosity (cSt) 100° C. | 40° C. | VI | Apparent Viscosity (centipoise) D5293 (−20° C.) |
|---|---|---|---|---|---|
| III | C | 14.32 | 96.97 | 152 | 3,410 |
| IV | D | 13.32 | 89.05 | 150 | 3,400 |

SAE J300 Standard for 10W-40 Engine Oils:
12.5 < cSt @ 100° C. < 16.3; cP @ −20° C. < 3500;

A comparative SAE 5W-30 lubricating oil composition is prepared as in Example I replacing the additive concentrate of the invention with 11.0% by weight of the listed comparative additive concentrate which contains comparative composition Comp 1.

COMP TABLE 1

| Comp Example | Additive Concentrate | Kinematic Viscosity (cSt) 100° C. | 40° C. | VI | Apparent Viscosity (centipoise) D5293 (−25° C.) |
|---|---|---|---|---|---|
| I | Comp A | 9.22 | 53.37 | 155 | 2,820 |

A comparative SAE 10W-40 lubricating oil composition is prepared as in Example III replacing the additive concentrate of the invention with 14.4% by weight of the listed comparative additive concentrate which contains comparative compositions Comp 1.

COMP TABLE 2

| Comp Example | Additive Concentrate | Kinematic Viscosity (cSt) 100° C. | 40° C. | VI | Apparent Viscosity (centipoise) D5293 (−20° C.) |
|---|---|---|---|---|---|
| II | Comp B | 12.91 | 85.82 | 150 | 3,430 |

Comparing the data in Table 1 with that in Comp Table 1, and the data in Table 2 with that in Comp Table 2, it is seen that compositions of this invention provide superior 100° C. kinematic viscosities to lubricating oils than do compositions that do not include the acylated terpolymer component in the composition.

The compositions of this invention permit the preparation of lubricants meeting 100° C. kinematic viscosity standards when corresponding compositions derived solely from acylated polyolefin fail to meet minimum 100° C. kinematic viscosity requirements.

When lubricants are used under shearing conditions, the viscosity of the lubricant often diminishes with time. The compositions of this invention permit the formulator to formulate lubricants at the higher end of the viscosity specification, without an adverse effect on low temperature performance, resulting in lubricants that "stay in grade" for a longer period of time.

The Normally Liquid Fuels

As indicated hereinabove, the products of this invention may also be used as additives for normally liquid fuels.

The fuels used in the fuel compositions of this invention are well known to those skilled in the art and usually contain a major portion of a normally liquid fuel such as hydrocarbonaceous petroleum distillate fuel (e.g., motor gasoline as defined by ASTM Specifications D-439-89 and D-4814-91 and diesel fuel or fuel oil as defined in ASTM Specifications D-396-90 and D-975-91). Fuels containing non-hydrocarbonaceous materials such a alcohols, ether, organo-nitro compounds and the like, are also within the scope of this invention as are liquid fuels derived from vegetable or mineral sources. A range of alcohol and ether type compounds are described as oxygenates. Oxygenate-containing fuels are described in ASTM D-4814-91. Mixtures of any of the above-described fuels are useful.

Particularly preferred fuels are gasoline, that is, a mixture of hydrocarbons having an ASTM boiling point of 60° C. at the 10% distillation point to about 205° C. at the 90% distillation point, oxygenates, and gasoline-oxygenate blends, all as defined in the aforementioned ASTM Specifications for automotive gasolines. Most preferred is gasoline.

The fuel compositions typically contain from about 0.001% to about 2% by weight, more often up to about 0.5%, even more often up to about 0.2% by weight of the additives of this invention.

The fuel compositions of the present invention may contain other additives which are well known to those skilled in the art. These can include anti-knock agents such as tetra-alkyl lead compounds, lead scavengers such as halo-alkanes, dyes, antioxidants such as hindered phenols, rust inhibitors such as alkylated succinic acids and anhydrides and derivatives thereof, bacteriostatic agents, auxiliary dispersants and detergents, gum inhibitors, fluidizers, metal deactivators, demulsifiers, anti-icing agents and the like. The fuel compositions of this invention may be lead-containing or lead-free fuels. Preferred are lead-free fuels.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A carboxylic composition comprising hydrocarbon substituted carboxylic acylating agents prepared by reacting a polyolefin and a terpolymer, simultaneously or individually in any order, with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

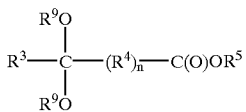

(VI)

wherein each of $R^3$ and $R^5$ and each $R^9$ is independently H or a hydrocarbyl group, $R^4$ is a divalent hydrocarbylene group, and n is 0 or 1.

2. The composition of claim 1 wherein the polyolefin has $\overline{M}_n$ ranging from about 300 to about 20,000.

3. An additive concentrate comprising from about 10–80% by weight of the carboxylic composition of claim 1 and from 20–90% by weight of a substantially inert organic diluent.

4. The composition of claim 3 wherein the polyolefin is derived from homopolymerized and interpolymerized $C_{2-10}$ olefins.

5. The composition of claim 4 wherein the polyolefin is an ethylene-propylene copolymer having $\overline{M}_n$ ranging from about 300 to about 10,000 and the ethylene content ranges from about 25% to about 75% by weight.

6. The composition of claim 3 wherein said polyolefin is a polybutene having $\overline{M}_n$ ranging from about 300 to about 5,000.

7. The composition of claim 6 wherein the polybutene is a polyisobutylene, at least about 30% of the chains having terminal vinylidene groups.

8. The composition of claim 7 wherein at least about 70% of the polyisobutylene chains have terminal vinylidene groups.

9. A lubricating oil composition comprising a major amount of an oil of lubricating viscosity and a minor amount of the carboxylic composition of claim 1.

10. The composition of claim 9 wherein the $C_{3-28}$ olefin is an alpha-olefin.

11. The composition of claim 9 wherein the mixture of monomers comprises ethylene, propylene and at least one non-conjugated diene.

12. The composition of claim 11 wherein the diene comprises at least one of aliphatic dienes and bicyclic dienes.

13. The composition of claim 12 wherein the diene is at least one of dicyclopentadiene and alkylidene norbornene.

14. The composition of claim 9 wherein the ethylene content of the terpolymer is from about 25% to about 85% by weight.

15. The composition of claim 9 wherein the non-conjugated polyene content of the terpolymer is from about 0.5% to about 15% by weight.

16. The composition of claim 1 wherein the at least one carboxylic reactant (IV) or reactive source thereof is a compound of the formula

(V)

wherein each of $R^3$ and $R^5$ is independently H or a hydrocarbyl group, $R^4$ is a divalent hydrocarbylene group, $R^9$ is hydrocarbyl and n is 0 or 1.

17. The composition of claim 16 wherein the compound (V) is a lower alkyl glyoxylate, lower alkyl hemiacetal.

18. The composition of claim 1 wherein the at least one carboxylic reactant (IV) or reactive source thereof is glyoxylic acid or a hydrate thereof.

19. The composition of claim 1 wherein the reaction of the terpolymer with the carboxylic reactant (IV) or reactive source thereof is conducted employing an acidic catalyst.

20. A process comprising mixing together carboxylic acylating agents obtained by reacting at least one polyolefin and at least one terpolymer, each individually with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

(VI)

wherein each of $R^3$ and $R^5$ and each $R^9$ is independently H or a hydrocarbyl group, $R^4$ is a divalent hydrocarbylene group, and n is 0 or 1.

21. The process of claim 20 wherein each of the polyolefin and the terpolymer is reacted with, independently, from about 0.8 to about 1.5 moles carboxylic reactant per equivalent of carbon to carbon double bonds in each of the polyolefin and the terpolymer.

22. The composition of claim 1 wherein the carboxylic composition is a mixture of hydrocarbon substituted carboxylic acylating agents, said mixture comprising (A) a polyolefin substituted carboxylic acylating agent; and (B) a terpolymer substituted carboxylic acylating agent; wherein (A) is prepared by reacting at least one polyolefin, and (B) is prepared by reacting at least one terpolymer; each individually with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

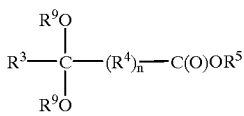
(VI)

wherein each of $R^3$ and $R^5$ and each $R^9$ is independently H or a hydrocarbyl group, $R^4$ is a divalent hydrocarbylene group, and n is 0 or 1.

23. A process comprising reacting a mixture of a polyolefin and a terpolymer with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

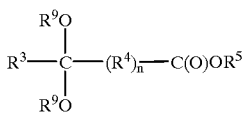
(VI)

wherein each of $R^3$ and $R^5$ and each $R^9$ is independently H or a hydrocarbyl group. $R^4$ is a divalent hydrocarbylene group, and n is 0 or 1.

24. The process of claim 23 wherein the mixture of polyolefin and terpolymer is reacted with from about 0.8 to about 1.5 moles carboxylic reactant per equivalent of carbon to carbon double bonds in the combination of polyolefin and terpolymer.

25. The composition of claim 1 wherein the carboxylic composition is the carboxylic acylating agent prepared by reacting a mixture of a polyolefin and a terpolymer with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

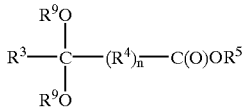
(VI)

wherein each of $R^3$ and $R^5$ and each $R^9$ is independently H or a hydrocarbyl group, $R^4$ is a divalent hydrocarbylene group, and n is 0 or 1.

26. A process comprising reacting a polyolefin with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

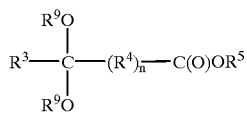
(VI)

wherein each of $R^3$ and $R^5$ and each $R^9$ is independently H or a hydrocarbyl group, $R^4$ is a divalent hydrocarbylene group, and n is 0 or 1, then adding to the reaction mixture at least one terpolymer and optionally additional carboxylic reactant then reacting the mixture.

27. The process of claim 26 wherein the initial charge of carboxylic reactant is from about 0.8 to about 1.5 moles per equivalent of carbon to carbon double bonds in the combination of polyolefin and terpolymer, the polyolefin is reacted with no more than about 1.5 moles of carboxylic reactant per equivalent of carbon to carbon double bonds in the polyolefin, and the total charge of carboxylic reactant, including any optionally added carboxylic reactant, is from about 0.8 to about 1.5 moles per equivalent of carbon to carbon double bonds in the combination of polyolefin and terpolymer.

28. The composition of claim 1 wherein the carboxylic composition is the carboxylic acylating agent prepared by reacting a polyolefin with at least one carboxylic reactant selected from the group consisting of compounds of the formula $$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

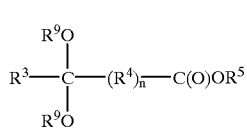
(VI)

wherein each of $R^3$ and $R^5$ and each $R^9$ is independently H or a hydrocarbyl group, $R^4$ is a divalent hydrocarbylene group, and n is 0 or 1, then adding to the reaction mixture at least one terpolymer and optionally additional carboxylic reactant then reacting the mixture.

29. A composition useful as a viscosity improving dispersant for lubricating oils comprising the composition of claim 28 further reacted with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with the carboxylic acylating agent simultaneously or sequentially, in any order.

30. An additive concentrate comprising from about 10–80% by weight of the carboxylic composition of claim 29 and from 20–90% by weight of a substantially inert organic diluent.

31. A composition useful as a viscosity improving dispersant for lubricating oils comprising the carboxylic composition of claim 22 further reacted with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with the mixture of carboxylic acylating agents simultaneously or sequentially, in any order.

32. A composition useful as a viscosity improving dispersant for lubricating oils comprising the carboxylic composition of claim 25 further reacted with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with the carboxylic acylating agents simultaneously or sequentially, in any order.

33. A composition useful as a viscosity improving dispersant for lubricating oils comprising a mixture obtained by combining the compositions obtained by further reacting components (A) and (B) of the carboxylic composition of claim 22, each individually, with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with each carboxylic acylating agent simultaneously or sequentially, in any order.

34. A lubricating oil composition comprising a major amount of an oil of lubricating viscosity and a minor amount of the carboxylic composition of claim 29.

35. A process comprising reacting a mixture of carboxylic acylating agents obtained by reacting at least one polyolefin and at least one terpolymer, each individually with at least one carboxylic reactant selected from the group consisting of compounds of the formula

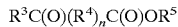
$$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

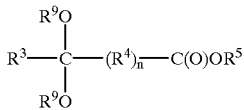
$$(VI)$$

wherein each of $R^3$ and $R^5$ and each $R^9$ is independently H or a hydrocarbyl group, $R^4$ is a divalent hydrocarbylene group, and n is 0 or 1, with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with each carboxylic acylating agent simultaneously or sequentially, in any order.

36. A process comprising reacting a carboxylic composition obtained by reacting a mixture of a polyolefin and a terpolymer with at least one carboxylic reactant selected from the group consisting of compounds of the formula

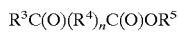
$$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

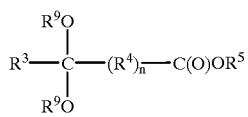
$$(VI)$$

wherein each of $R^3$ and $R^5$ and each $R^9$ is independently H or a hydrocarbyl group, $R^4$ is a divalent hydrocarbylene group, and n is 0 or 1 with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with each carboxylic acylating agent simultaneously or sequentially, in any order.

37. A process comprising reacting each carboxylic acylating agent obtained by reacting at least one polyolefin and at least one terpolymer, individually, with at least one carboxylic reactant selected from the group consisting of compounds of the formula

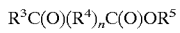
$$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

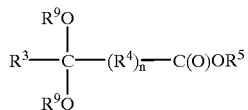
$$(VI)$$

wherein each of $R^3$ and $R^5$ and each $R^9$ is independently H or a hydrocarbyl group, $R^4$ is a divalent hydrocarbylene group, and n is 0 or 1, with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with each carboxylic acylating agent simultaneously or sequentially, in any order, then combining the products obtained thereby.

38. A process comprising reacting a carboxylic composition obtained by reacting a polyolefin with at least one carboxylic reactant selected from the group consisting of compounds of the formula

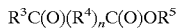
$$R^3C(O)(R^4)_nC(O)OR^5 \quad (IV)$$

wherein each of $R^3$ and $R^5$ is independently H or a hydrocarbyl group, $R^4$ is a divalent hydrocarbylene group, and n is 0 or 1, and reactive sources thereof having the general formula

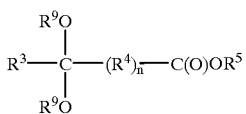

(VI)

wherein each of $R^3$ and $R^5$ and each $R^9$ is independently H or a hydrocarbyl group, R is a divalent hydrocarbylene group, and n is 0 or 1, then adding to the reaction mixture at least one terpolymer and optionally additional carboxylic reactant, then reacting the mixture, with at least one reactant selected from the group consisting of (1) an amine characterized by the presence within its structure of at least one HN<group; (2) an alcohol; (3) a reactive metal or a reactive metal compound; and (4) a mixture of 2 or more of (1) through (3); the components of (4) being reacted with the carboxylic acylating agent simultaneously or sequentially, in any order.

39. The composition of claim 31 wherein the polyolefin is a polyisobutylene, at least about 30% of the chains having terminal vinylidene groups, and the terpolymer is an ethylene-propylene-non-conjugated diene terpolymer.

40. The composition of claim 31 wherein the carboxylic reactant (IV) or reactive source thereof is selected from the group consisting of glyoxylic acid, glyoxylic acid monohydrate, and a lower alkyl glyoxylate, lower alkyl hemiacetal.

41. The composition of claim 31 wherein the amine is an ethylene polyamine.

42. The composition of claim 32 wherein the polyolefin is a polyisobutylene, at least about 30% of the chains having terminal vinylidene groups, and the terpolymer is an ethylene-propylene-non-conjugated diene terpolymer.

43. The composition of claim 32 wherein the carboxylic reactant (IV) or reactive source thereof is selected from the group consisting of glyoxylic acid, glyoxylic acid monohydrate, and a lower alkyl glyoxylate, lower alkyl hemiacetal.

44. The composition of claim 32 wherein the amine is an ethylene polyamine.

45. The composition of claim 33 wherein the polyolefin is a polyisobutylene, at least about 30% of the chains having terminal vinylidene groups, and the terpolymer is an ethylene-propylene-non-conjugated diene terpolymer.

46. The composition of claim 33 wherein the carboxylic reactant (IV) or reactive source thereof is selected from the group consisting of glyoxylic acid, glyoxylic acid monohydrate, and a lower alkyl glyoxylate, lower alkyl hemiacetal.

47. The composition of claim 33 wherein the amine is an ethylene polyamine.

48. The composition of claim 29 wherein the polyolefin is a polyisobutylene, at least about 30% of the chains having terminal vinylidene groups, and the terpolymer is an ethylene-propylene-non-conjugated diene terpolymer.

49. The composition of claim 29 wherein the carboxylic reactant (IV) or reactive source thereof is selected from the group consisting of glyoxylic acid, glyoxylic acid monohydrate, and a lower alkyl glyoxylate, lower alkyl hemiacetal.

50. The composition of claim 29 wherein the amine is an ethylene polyamine.

51. An additive concentrate comprising from about 10–80% by weight of the carboxylic composition of claim 31 and from 20–90% by weight of a substantially inert organic diluent.

52. A lubricating oil composition comprising a major amount of an oil of lubricating viscosity and a minor amount of the carboxylic composition of claim 31.

53. An additive concentrate comprising from about 10–80% by weight of the carboxylic composition of claim 32 and from 20–90% by weight of a substantially inert organic diluent.

54. A lubricating oil composition comprising a major amount of an oil of lubricating viscosity and a minor amount of the carboxylic composition of claim 32.

55. An additive concentrate comprising from about 10–80% by weight of the carboxylic composition of claim 33 and from 20–90% by weight of a substantially inert organic diluent.

56. A lubricating oil composition comprising a major amount of an oil of lubricating viscosity and a minor amount of the carboxylic composition of claim 33.

* * * * *